United States Patent [19]

Clark

[11] 3,909,648
[45] Sept. 30, 1975

[54] ELECTRIC MOTOR HAVING A WINDING INSULATING BARRIER AND METHOD OF CONSTRUCTION

[75] Inventor: Norman D. Clark, Dayton, Ohio

[73] Assignee: A. O. Smith Corporation, Milwaukee, Wis.

[22] Filed: July 27, 1973

[21] Appl. No.: 383,123

[52] U.S. Cl. ............... 310/260; 310/192; 310/194; 336/206
[51] Int. Cl.² ......................................... H02K 3/46
[58] Field of Search ........... 310/260, 270, 192, 208, 310/184, 271, 185, 215, 216, 217, 218, 194, 180; 336/206, 135, 165, 178, 185, 208

[56] References Cited
UNITED STATES PATENTS

| | | | |
|---|---|---|---|
| 2,701,317 | 2/1955 | Herman | 310/260 |
| 2,998,540 | 8/1961 | Phillips | 310/260 |
| 3,062,978 | 11/1962 | Smith | 310/185 |
| 3,235,762 | 2/1966 | Brammerlo | 310/185 |
| 3,439,205 | 4/1969 | Houtman | 310/260 |
| 3,519,862 | 7/1970 | Walker | 310/214 |
| 3,575,623 | 4/1971 | Stine | 310/260 |
| 3,735,169 | 5/1973 | Balke | 310/214 |
| 3,768,152 | 10/1973 | Swanke | 310/260 |

*Primary Examiner*—R. Skudy
*Attorney, Agent, or Firm*—Andrus, Sceales, Starke & Sawall

[57] ABSTRACT

An insulating barrier between starting and running windings in a stator core includes insulating pegs between the windings having oppositely disposed axial projections extending beyond the outer axial ends of the stator core, and a plurality of end turn insulating separators each having a pair of transverse sections oppositely disposed at axial ends of the core interconnected by a plurality of legs disposed within predetermined stator slots and particularly between the starting and running windings adjacent to the insulating pegs with the pegs and separators overlapping for complete electrical insulation between the first and second windings. A coil transfer apparatus having a movable stripper operates to simultaneously transfer the end turn insulators and the starting coils into the stator slots, preferably through the use of a plastic circular guide element.

3 Claims, 8 Drawing Figures

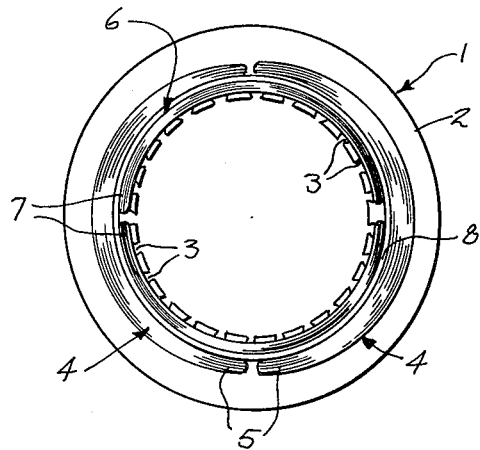
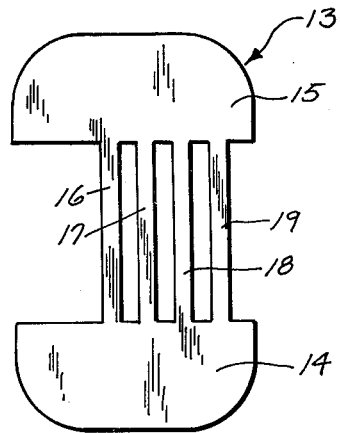
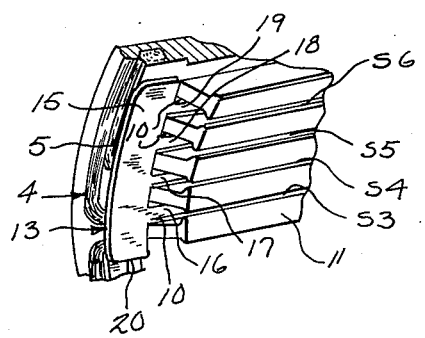
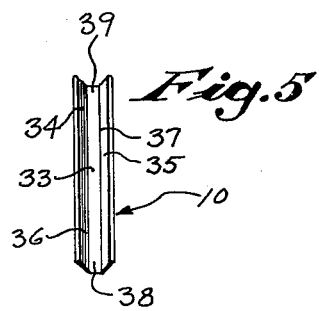
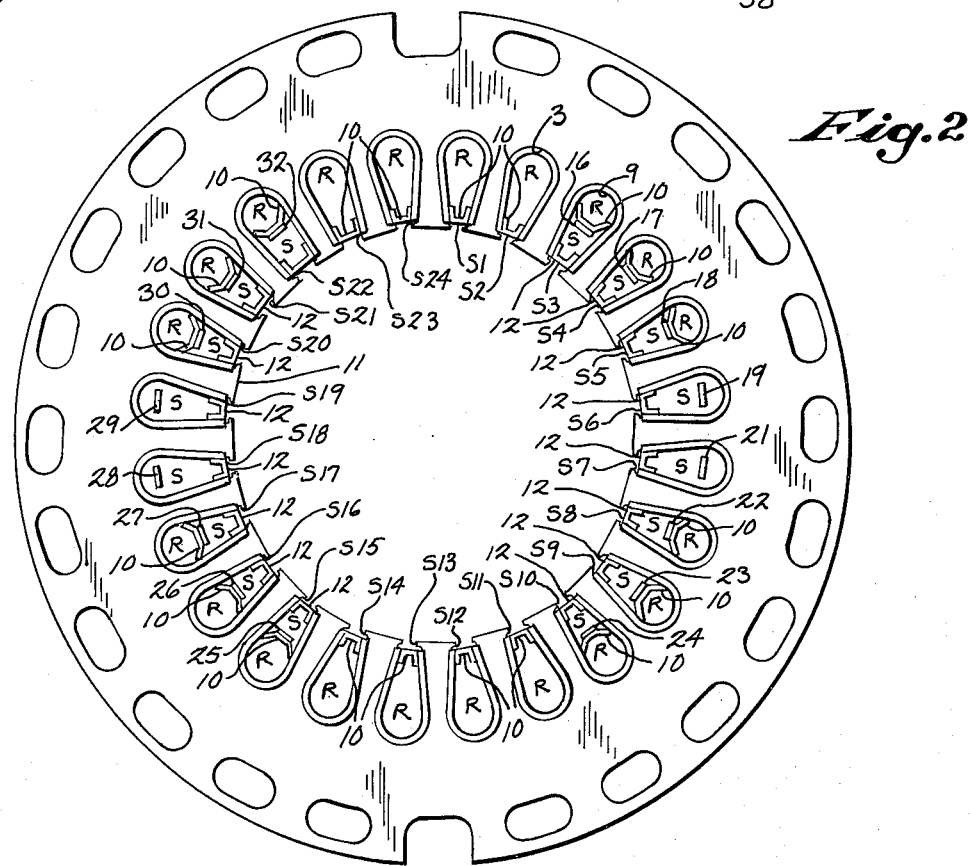

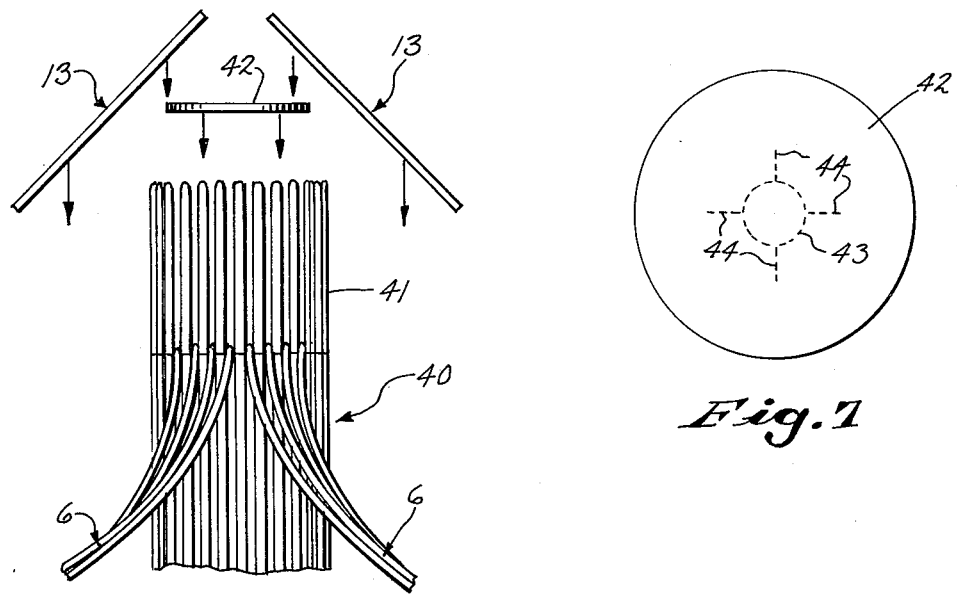
Fig. 6
Fig. 7
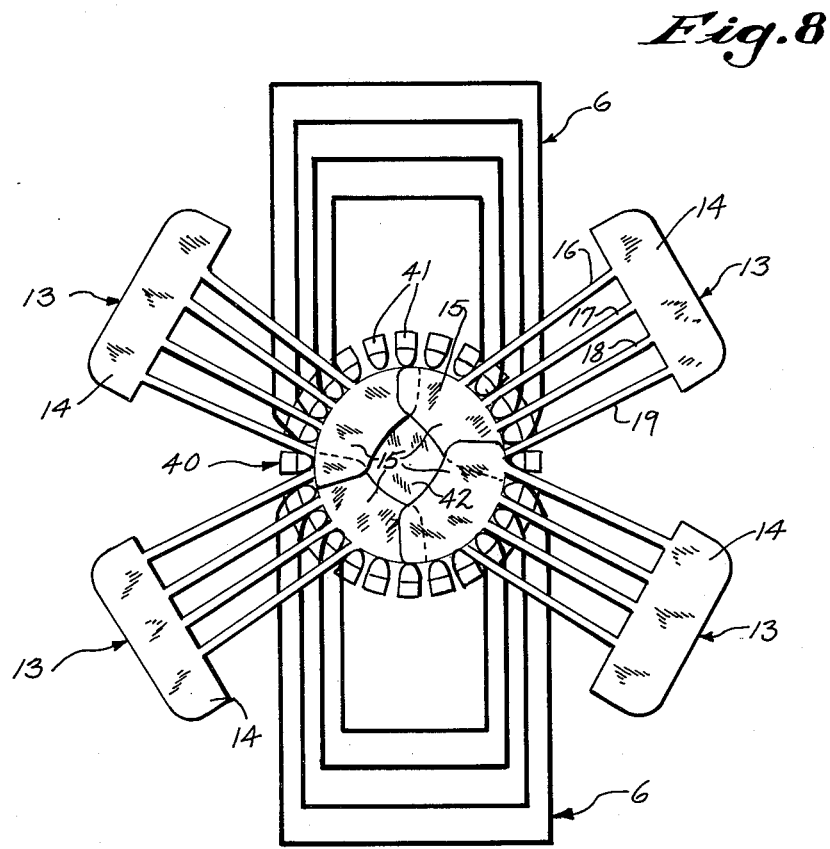
Fig. 8

ELECTRIC MOTOR HAVING A WINDING INSULATING BARRIER AND METHOD OF CONSTRUCTION

BACKGROUND OF THE INVENTION

This invention relates to a stator assembly for a dynamoelectric machine in which an insulating barrier means is placed between two or more windings or coils.

Insulating barriers of various types have been used between starting and running windings in an attempt to electrically insulate one winding from another both within the stator slots and at the end turns. One known type of insulating barrier has consisted of a multiplicity of unitary, spatulate pieces of insulating material each designed for use within a single stator slot which are alternately hand inserted from opposite ends of the stator assembly, as illustrated in U.S. Pat. No. 2,998,540. Such spatulate insulating pieces have generally contained transverse slits near the juncture of the head and shank parts.

Other known types of insulating barrier constructions between running and starting windings have included end turn insulating separators which provide a pair of transverse sections oppositely disposed at axial ends of the stator assembly which are interconnected by only a pair of legs. Because of the width of the transverse sections, many of the stator slots containing both the running and starting windings have not contained legs of the end turn separators thus necessitating the employment of varying length insulating pegs within the slots in order to provide complete electrical insulation, particularly at the axial ends of the stator slots. Thus, longer insulating pegs have been hand inserted within slots between the starting and running windings which have not contained legs of the end turn separators while substantially shorter insulating pegs were hand or machine inserted into slots containing such legs.

Frequently, such various types of insulating pegs used to separate the running and starting windings differed in size and construction from the insulating pegs used to close the stator slots and spaced adjacent to the rotor bore which have been commonly machine inserted. Such constructions have necessitated the fabrication of different sizes and types of insulating pegs and have required costly and numerous time consuming steps of assembly, some of which were performed by hand.

SUMMARY OF THE INVENTION

This invention relates to a new stator construction employing an insulating barrier construction which electrically insulates two or more coils or windings both within the stator slots and at the axial ends of the stator core and further relates to a new and simplified method of assembly.

In accordance with the invention, an insulating barrier means is placed within the slots containing two or more coils or windings for complete electrical insulation between the plurality of coils both within the slots and at the end turns including the area near the axial extremities of the stator core assembly. Specifically, insulating pegs are placed within the slots containing the plurality of coils or windings to provide the electrical separation therebetween with each peg including oppositely disposed axial projections extending beyond the outer axial ends of the stator core assembly.

A plurality of end turn insulating separators each provide a pair of transverse sections which are oppositely disposed at the axial ends of the stator assembly and are interconnected by a plurality of legs which are placed within predetermined stator slots. The end turn insulating separators are specially constructed so that each common slot containing a plurality of coils or windings and a separating insulating peg contains one of the legs disposed between the windings adjacent to the insulating peg. Thus, the legs of the end turn insulators and the insulating pegs combine to electrically separate and insulate the two windings within a slot. Furthermore, the projections provided by the insulating pegs which axially extend beyond the stator core overlap or engage the transverse sections of the end turn insulators to provide complete electrical separation and insulation between the plurality of coils or windings, including at the area near the axial extremities of the stator core assembly.

Preferably, the transverse sections of adjacent end turn insulators are positioned to overlap in engaging relationship to further maintain complete electrical insulation between the plurality of coils or windings at their end turns. In a further aspect of the invention, the insulating pegs separating the windings within a slot are disposed radially outward of the legs of the end turn insulating separators.

The invention further includes a new and novel method of forming a wound stator core having a plurality of stator laminations with aligned slots containing two or more coils or windings which are separated or insulated by insulating pegs and end turn insulators. Specifically, a coil transfer apparatus of the type utilizing a movable stripper, such as illustrated in U.S. Pat. No. 3,689,976, issued on Sept. 12, 1972, and assigned to a common assignee, for example, is utilized for transferring at least one or more of the pre-wound coils into certain of the slots. In a broad aspect of the invention, the method includes the steps of inserting the first winding or coils into predetermined ones of the winding slots followed by the insertion of insulating pegs into predetermined slots including the slots containing the first coils. In a preferred form of the invention, the first coils or windings and the insulating pegs are sequentially inserted by one operation of a coil transfer apparatus. Subsequently, the second coils are placed upon a coil transfer apparatus followed by the placing of a plurality of the end turn insulators thereon. The movable stripper is operated to simultaneously transfer the end turn insulators and the second coils into predetermined ones of the slots so that each slot containing both the first and second coils will contain an insulating peg and a portion of an end turn insulator to completely electrically insulate the pair of coils or windings.

The insertion of a portion of the end turn insulators within each slot containing both windings and located adjacent to the insulating pegs permits the use of uniformly sized insulating pegs in all slots. Such pegs may also be utilized to close the slots to electrically insulate the windings from the stator bore. Uniformity of dimension of the insulating pegs made possible by the specially constructed end turn insulators also permits automatic machine insertion of the insulating pegs thereby eliminating steps of fabrication, some of which were manual in nature.

A guide type element may be conveniently utilized in conjunction with the coil transfer apparatus and is generally placed between the second group of windings or coils and the end turn insulators when they are placed or mounted on the coil transfer apparatus. The guide element is effective in guiding the end turn insulators into the proper stator slots without experiencing damage or resistance due to interference and/or pressure caused by individual wires which make up the second coil or winding.

BRIEF DESCRIPTION OF THE DRAWINGS

The drawings furnished herewith illustrate the best mode presently contemplated by the inventor and clearly discloses the above advantages and features, as well as others which will be readily understood from the detailed description thereof.

In the drawings:

FIG. 1 is a plan view of a stator assembly illustrating an insulating barrier between the end turns of the running and starting windings;

FIG. 2 is a diagrammatical illustration of the stator assembly of FIG. 1 showing the placement of the end turn insulators and insulating pegs within the stator slots between the running and starting windings;

FIG. 3 is a fragmentary view in perspective showing the placement of an end turn insulator and several insulating pegs within several slots of the stator assembly of FIG. 1;

FIG. 4 is an elevational view showing the end turn insulator of FIG. 3;

FIG. 5 is an elevational view showing an insulating peg employed in the stator assembly of FIG. 3;

FIG. 6 is a fragmentary elevational view showing a coil transfer apparatus and the placement of windings, end turn insulators and a guide thereon;

FIG. 7 is a plan view showing the guide element of FIG. 6; and

FIG. 8 is a plan view of the coil transfer apparatus of FIG. 6 showing the placement of the end turn insulators, windings and guide element thereon.

DESCRIPTION OF THE PREFERRED ILLUSTRATED EMBODIMENT

Referring to the drawings and particularly FIG. 1, a stator core 1 is formed from a plurality of stacked laminations 2 which are secured to provide a plurality of circumferentially spaced and aligned winding slots 3. A two pole main or running winding 4 is mounted within predetermined slots 3 and provides end turns 5 at axial ends of the stator core 1. A phase or starting winding 6 is located within predetermined slots 3 and mounted axially inward from the main or running winding 4 and provides end turns 7, also at axial ends of the stator core 1. An insulating barrier 8 is placed within predetermined slots 3 and provides an electrical separating and insulating barrier between the main or running windings 4 and the phase or starting winding 6, as will be more clearly described hereinafter.

The stator core 1 is shown with 24 stator slots 3 which are designated S1 through S24 in FIG. 2 although other sized motors having varying numbers of slots may also utilize the subject invention. Each slot 3 preferably contains an insulating cuff 9 of conventional design which electrically insulates the windings within the slot from the stator core laminations 2. For purposes of clarity in illustration of the present invention, the main or running winding 4 is designated R and the starting or phase winding 6 is designated S in FIG. 2.

To illustrate one of many possible winding configurations for using the subject invention, the running winding R in FIG. 2 is located within the slots S1 through S5, S8 through S17, and S20 through S24 while the starting winding S is located within slots S3 through S10 and S15 through S22. It is therefore evident that certain stator slots contain only one winding while other slots contain both the starting and the running windings.

In accordance with the invention, a plurality of insulating pegs 10 are located within the stator slots S1 through S5, S8 through S17 and S20 through S24, and insulate the running winding R within the slots 3. As shown in FIG. 2, the insulating pegs 10 are utilized within the slots S1, S2, S11 through S14, S23 and S24 which contain only the running winding R to separate and electrically insulate the winding from the rotor bore 11 and to close the stator slots 3. The insulating pegs 10 are also utilized within the slots S3 through S5, S8 through S10, S15 through S17, and S20 through S22 which contain both the running and starting windings, to separate and electrically insulate the running winding from the starting winding within the stator slots 3.

A plurality of insulating pegs 12 are located within the slots S3 through S10 and S15 through S22 which contain the starting winding S. The pegs 12 are identical in size and design to the pegs 10 and are utilized to electrically insulate and separate the starting winding S from the stator bore 11 and to close the stator slots 3.

A plurality of end turn insulating members 13, as shown in FIGS. 3 and 4, are employed within the slots 3 for providing electrical insulation and separation between the end turns 5 and 7 of the running and starting windings, respectively, while providing further electrical insulation between the two windings within the slots 3. Specifically, each end turn insulating member 13 includes a pair of spaced transverse insulating members 14 and 15 which are joined by a plurality of legs 16, 17, 18 and 19. The transverse sections 14 and 15 of adjacent end turn insulating members 13 overlap such as illustrated at 20 to provide complete circumferential insulation between the end turns.

The legs 16 through 19 are located within certain of the slots 3 so that the transverse sections 14 and 15 are axially located beyond the outer extremities of the stator core 1 and are positioned between the end turns 5 and 7 to provide electrical separation and insulation therebetween. With reference to FIG. 2, the legs 16 through 19 are positioned within slots S3 through S6, respectively while an adjacent end turn insulator provides legs 21 through 24 within the stator slots S7 through S10, respectively, while a third end turn insulator provides legs 25 through 28 within stator slots S15 through S18, respectively, while a fourth end turn insulator provides legs 29 through 32 within stator slots S19 through S22, respectively. The disclosed embodiment thus utilizes four end turn insulators 13 although it is contemplated that varying numbers of such specially constructed insulators could be utilized with varying sized motors.

While the total number of winding slots may differ for different sizes of motors, thus varying the number of slots containing running and starting windings, it is important that each slot containing both a running and a starting winding contain one leg of the end turn insulating member 13 to cooperate with the insulating pegs 10 to provide complete electrical insulation between the windings. Specifically, the illustrated legs 16, 17, and 18 of the end turn insulator 13 are placed within the stator slots S3 through S5, respectively, to be adjacent to the insulating peg 10 thereby providing further electrical insulation and separation between the running windings R and the starting windings S as will be further described hereinafter.

As insulating peg 10 is illustrated in FIG. 5 and includes a main body portion 33 and a pair of oppositely disposed side walls 34 and 35 which are flexibly connected to the main body portion 33 by folds 36 and 37, respectively. When inserted within a stator slot 3, the side walls 34 and 35 of peg 10 flex to engage the opposite sides of the insulating cuffs 9 thus surrounding a winding within a slot with electrical insulation.

The insulating peg 10 is specially designed to have a length which is greater than the distance between the opposite transverse portions 14 and 15 of each end turn insulating member 13. Thus, the peg 10 provides opposite ends 38 and 39 which engage and overlap with the transverse sections 14 and 15, respectively of the end turn insulator 13 to provide a complete and uniform electrical insulating barrier 8 between the two windings 4 and 6 both within the slots, at the end turns, and at the axial extremities of the stator core 1. The legs 16 through 19 of the end turn insulator 13 are located radially inward and cooperate in abutting relationship with the adjacent corresponding insulating pegs 10 and particularly with each main body portion 33 to provide added reinforcement for the insulating barrier 8 and limit movement of the pegs 10 within the winding slots.

The inclusion of the legs of the end turn insulating members within each slot containing both the running and starting windings 4 and 6 eliminates the necessity of hand insertion of lengthy insulating pegs within such slots to provide complete electrical insulation at the axial ends of the stator core 1. The specially designed end turn insulating members thus permits the use of uniformly sized insulating pegs 10 and 12 to both electrically separate the windings within a stator slot and to enclose the stator slot from the stator bore.

Such uniformity of design of the insulating pegs 10 and 12 along with the specially designed end turn insulating members 13 have permitted the use of a new and novel method of fabrication utilizing a coil transfer apparatus, such as shown in the patent to Donovan, U.S. Pat. No. 3,689,976, issued on Sept. 12, 1972, and assigned to a common assignee herewith. With reference to FIG. 6, a coil transfer apparatus 40 includes a plurality of spaced blades 41 which correspond to the stator slots 3 into which the prewound coils are to be inserted. The description of the coil transfer apparatus and its operation is found in the U.S. Pat. No. 3,689,976 and further discussion thereof is deemed unnecessary. In accordance with the method of assembly, prewound coils which constitute the running windings 4 are placed between certain blades 41 of the coil transfer apparatus which, in turn, are aligned with the stator core 1 with respect to predetermined stator slots 3. The operation of a movable stripper carrying movable blades of the coil transfer apparatus 40 inserts the prewound coils 4 into the appropriate slots 3 while the wedge holders of the coil transfer apparatus 40 thereafter become operative to axially inject the insulating pegs 10 into the stator slots 3 to provide electrical insulation for the running windings R.

Following insertion of the running windings 4, the coil transfer apparatus is withdrawn from the stator core 1 so that starting windings 6 may be placed between certain preselected blades 41. A circumferentially shaped disc 42 is placed within the circumferential opening between the blades 41 of the coil transfer apparatus 40 to become located upon the starting windings 6 contained therein. The guide disc 42 may optionally contain an inner circumferential opening 43 and a plurality of radial slits 44 which permit added flexibility of the guide. Subsequently, the plurality of end turn insulating members 13 are placed upon the coil transfer apparatus 40 so that the plurality of legs, such as 16 through 19, become located between predetermined blades 41, as shown in FIG. 8. The second operation of the movable stripper of the coil transfer apparatus into and through the stator bore 11 simultaneously inserts both the end turn insulating members 13 and the starting winding 6 into the appropriate stator slots 3 so that each slot containing a starting winding also contains a leg from one of the end turn insulating members 13. When completing the insertion of the starting winding 6, the wedge holders of the coil transfer apparatus 40 again become operative to insert the insulating pegs 12 into certain slots 3 as above described to electrically insulate the starting winding 6 from the stator bore 11.

The stator core assembly of the present invention which provides completely insulated starting and running windings may conveniently be utilized in single and three phase A.C. fractional horsepower induction motors of the permanent split capacitor type employing a hermetic stator assembly and a squirrel cage rotor for use within compressor assemblies or the like.

It is therefore evident that the end turn insulating members 13 which cooperate with the insulating pegs 10 within the slots between the running and starting windings provide a highly effective and desirable insulating barrier between the windings. After the windings, end turn insulators and insulating pegs have been inserted, the stator core and windings may be subjected to further steps of fabrication before being connected to an electrical compressor or other type of operation Various modes of carrying out the invention are contemplated as being within the scope of the following claims, particularly pointing out and distinctly claiming the subject matter which is regarded as the invention.

I claim:

1. A stator assembly for a dynamoelectric machine having a plurality of spaced, axially extending slots, a first winding, a second winding, said first and second windings wound in said slots and including a plurality of common slots retaining both said first and second windings, wherein the improvement comprises an insulating barrier means disposed between said first and second windings including a plurality of insulating pegs each disposed within said common slots and electrically separating said first and second windings and including oppositely disposed axial projections extending beyond the outer axial ends of said stator assembly, and a plurality of end turn insulating separators each including a pair of transverse sections oppositely disposed at axial ends of said stator assembly and interconnected by a plurality of legs each disposed within one of said common slots with each of said common slots containing a leg disposed adjacent to a peg and electrically separating said first and second windings, said axial projections of said pegs and said transverse sections overlapping and providing complete electrical insulation between said first and second windings.

2. The assembly of claim 1, wherein said adjacent transverse sections overlap and maintain electrical insulation between said first and second windings.

3. The assembly of claim 1, wherein said insulating pegs separating said first and second windings are disposed radially outward from said legs of said end turn insulating separators.

* * * * *